Patented Aug. 19, 1924.

1,505,382

UNITED STATES PATENT OFFICE.

JOSEPH FILHOL, OF LYONS, FRANCE.

PROCESS OF MANUFACTURING FORMOLOPHENOLIC VARNISHES AND THE LIKE.

No Drawing.   Application filed June 24, 1920.   Serial No. 391,463.

*To all whom it may concern:*

Be it known that I, JOSEPH FILHOL, a citizen of the French Republic, of Lyons, France, have invented certain new and useful Processes of Manufacturing Formolophenolic Varnishes and the like, of which the following is a specification.

In the known methods of manufacture of formolophenolic varnishes and plastic materials, phenol and formaldehyd are condensed at a temperature between 80° and 110° C., giving a derivative of saligenine

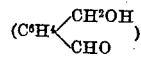

and produced in the presence of a catalyzer which is composed either of an acid or of an alkali.

During the first stage of condensation either a liquid or a fusible solid is obtained which is slightly viscous when heated and soluble in alcohol, acetone, etc., this in the final stage of use is converted by more or less prolonged heating between 120° and 180° C., into an infusible and insoluble product. The conversion can be effected after the impregnation of the goods to be coated or protected.

The known methods mostly give products, to obtain the final properties of which require submitting to temperatures of from 120 to 180° C. for several hours.

This indispensable heating considerably limits the use of these products, either in varnish or plastic material form.

For instance, certain substances to be coated cannot undergo so high a temperature without losing certain of their properties. Or again it may be necessary to varnish a machine or the like without taking it to pieces, and as it is impossible to heat articles of large dimensions in an autoclave, the use of such varnish is prohibited.

The object of the present invention (the initial product of condensation being prepared), is to allow of obtaining the final hardening of said product either at atmospheric temperature or at low temperatures from 30 to 45° C. This result is obtained by the consecutive and additional action of two catalyzers, suitably selected, one alkaline, the other acid, under determined conditions.

The process is as follows:—A product of formolophenolic condensation is prepared in an alkaline medium composed either of carbonate of ammonia or of basic phenate of ammonia: it is polymerized hot between 75° and 80° C. until viscidity is considerably increased and approaches that which marks the limit state of polymerization, corresponding to the solidification and the insolubility of the product. (This limit point can be determined by comparative measurements of viscidity and solubility in alcohol.) If this product were cooled below 50° C. at this limit stage it would no longer polymerize nor further increase its viscidity in the presence of the alkaline catalyzer, whatever might be the duration of the action of the latter.

But this product treated with an acid catalyzer, (composed of an acid ester with alcohol) acquires the property of continuing polymerization at a low temperature (between 14° and 40° C.) and that until the ultimate hardening stage. Thus is obtained at a low temperature an insoluble product infusible and impenetrable by acids, that is to say, having properties as good as those obtained, by the known methods, by heating between 120° and 180° C.

The time required for obtaining this final stage is about 24 to 36 hours at temperatures varying from 25° to 14° C. and from 1 to 2 hours only at temperatures between 45° and 30°.

The product of the first stage should be as far dehydrated as possible, that is to say, it should contain a quantity of water not exceeding 3 to 5%.

Among the various acid catalyzers composed of acid ester, the most suitable is bisulphate of ethyl. It is employed by adding it in the proportion of ½ to 5% of the product, after having previously dissolved it in twice to three times its volume of alcohol at 95°.

As phenolic raw material can be employed any of the series of phenols or their commercial mixtures.

As formolic raw material can be employed either commercial solution of formol of 35% or a polymer of formol such as trioxymethylene.

Example:—Into a vat of 2,000 litres capacity are introduced 1,000 litres of raw cresol, then 800 kilogr. of commercial formol (35% solution) and finally 20 kilogr. of carbonate of ammonia. The mixture is gradually brought to the temperature of 75°-80°. When the formaldehyde has combined with the cresol, the aqueous layer is decanted, then the small quantity of water remaining in suspension is evaporated in vacuum. The heating is continued at 75°-80° until the viscosity has attained the desired degree. Then are added 500 kgr. of ethylic alcohol at 95° and the heating is continued until the viscidity has again attained the former degree. To the product obtained is added some days before its use 10% of a solution of 50% bisulphate of ethyl in alcohol.

Instead of employing, in the first stage, products composed of the saliretin (soluble fusible phenol-formaldehyde resins), acetylated derivatives of said products can be employed which are obtained by causing the acetic anhydrid to act hot (in the proportion, for instance, of one molecule of acetic anhydrid to 5 molecules of phenol). These acetylated derivatives condense hot or cold by the subsequent action of the bisulphate of ethyl producing varnishes and plastic materials which have great practical advantages as regards transparency, plasticity, lustre and facility of working.

These same derivatives have also the property of mingling in any proportion with acetonic solutions of acetyl-cellulose while giving more elastic products.

The following is an example of this variation:—100 kgrs. of phenol supplemented by 37 kgrs. of trioxymethylene and 2 kgrs. of basic carbolic salt of ammonia is heated. When the trioxymethylene has been dissolved, the salyretic derivative is obtained, the small quantity of water left is removed and from 15 to 20 kgrs. of acetic anhydride is added. The heating is continued until the desired viscidity is obtained. Finally from 1 to 2% of bisulphate of ethyl is added to the product, which is molded. This on merely standing for a long period hardens, or it may be heated to 60 to 70° C. to harden the same in a much shorter time. In this example, the acetic acid present greatly slows down the rapidity of the hardening operation.

What I claim as my invention and desire to secure by Letters Patent of the United States is:—

1. A process of manufacturing formolophenolic products consisting in preparing a product of formolophenolic condensation in an alkaline medium, gradually heating same to between 75° and 80° C. until viscosity approaches that of the limit state of polymerization, separating therefrom, in a liquid state the major part of the aqueous liquor, dehydrating the product and then treating the product with a catalyzer composed of acid ester and alcohol, the polymerization being then continued at not above 70° C., until the ultimate hardening stage.

2. A process of manufacturing formolophenolic products consisting in preparing a product of formolophenolic condensation in the presence of a volatile alkali, at a temperature between 75° and 80° C. until viscosity approaches that of the limit state of polymerization, renewing the alkali and dehydrating the product, then treating the product at room temperature with an acid catalyzer consisting of bisulphate of ethyl dissolved in alcohol, and allowing the final hardening to go on at room temperature.

3. A process of preparing hard condensation products which comprises reacting on a phenol with formaldehyde in the presence of a volatile alkali, heating sufficiently to induce the formation of a fusible condensation product soluble in alcohol, removing the aqueous liquid from said product, adding an acid ester of a mineral acid and a volatile liquid which is a solvent thereof and of the fusible condensation product, shaping the product and hardening the same at not above 45° C.

4. A process which comprises adding to a fusible condensation product of phenol and formaldehyde, which is soluble in alcohol and which is free from alkali metal salts, an acid ester of an inorganic acid, and alcohol, and hardening the product at about room temperature.

In witness whereof I have signed this specification in the presence of two witnesses.

JOSEPH FILHOL.

Witnesses:
JULIAN KEMBLE SMECBERG,
LUCIENNE BERWERET.